(12) United States Patent
Jackson et al.

(10) Patent No.: US 9,567,100 B2
(45) Date of Patent: Feb. 14, 2017

(54) E-TAXI PREDICTIVE PERFORMANCE SYSTEM

(71) Applicant: HONEYWELL INTERNATIONAL INC., Morristown, NJ (US)

(72) Inventors: Patrick Jackson, Peoria, AZ (US); Joseph Nutaro, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/258,798

(22) Filed: Apr. 22, 2014

(65) Prior Publication Data

US 2015/0298817 A1    Oct. 22, 2015

(51) Int. Cl.
| | |
|---|---|
| G05D 1/02 | (2006.01) |
| G08G 5/00 | (2006.01) |
| G08G 5/06 | (2006.01) |
| B64D 45/00 | (2006.01) |
| B64C 25/40 | (2006.01) |
| G05D 1/00 | (2006.01) |

(52) U.S. Cl.
CPC ............ B64D 45/00 (2013.01); B64C 25/405 (2013.01); G05D 1/0083 (2013.01); G05D 1/0202 (2013.01); G08G 5/0021 (2013.01); G08G 5/065 (2013.01)

(58) Field of Classification Search
CPC .... G08G 5/065; G08G 5/0021; G05D 1/0083; G05D 1/0202; B64C 25/405
See application file for complete search history.

(56) References Cited

U.S. PATENT DOCUMENTS

| | | | |
|---|---|---|---|
| 5,478,295 A * | 12/1995 | Fracchia | ............................ 482/7 |
| 6,571,166 B1 | 5/2003 | Johnson | |
| 7,382,284 B1 | 6/2008 | Armstrong | |
| 7,445,178 B2 | 11/2008 | McCoskey et al. | |
| 8,620,493 B2 * | 12/2013 | Hughes et al. | .................... 701/3 |
| 2002/0077743 A1 * | 6/2002 | Schmidt | ....................... 701/120 |
| 2007/0282491 A1 | 12/2007 | Cox et al. | |
| 2010/0125403 A1 * | 5/2010 | Clark et al. | .................... 701/120 |
| 2010/0204909 A1 * | 8/2010 | Gayraud et al. | ............. 701/120 |
| 2011/0202205 A1 * | 8/2011 | Pepitone et al. | .................. 701/3 |
| 2011/0290933 A1 * | 12/2011 | Cros et al. | ....................... 244/50 |
| 2011/0313645 A1 * | 12/2011 | Shukla | .......................... 701/120 |

(Continued)

FOREIGN PATENT DOCUMENTS

| | | |
|---|---|---|
| EP | 1718931 A1 | 11/2005 |
| EP | 2565861 A2 | 3/2013 |

(Continued)

OTHER PUBLICATIONS

Search report from EP application No. 15166951.2 dated Sep. 30, 2015.

*Primary Examiner* — Aaron L Troost
*Assistant Examiner* — Thomas Ingram
(74) *Attorney, Agent, or Firm* — Shimokaji IP

(57) ABSTRACT

An electric taxi predictive performance system may provide a predicted performance for an electric based taxi system (eTaxi) based on environmental information related to a vehicle. In some embodiments, the vehicle may be an aircraft using eTaxi systems to move around an airport runway system. The electric predictive taxi performance system may provide real-time displayed data to help pilots evaluate eTaxi capabilities of the aircraft as conditions change.

20 Claims, 5 Drawing Sheets

(56) References Cited

U.S. PATENT DOCUMENTS

2013/0057414 A1* 3/2013 Nutaro et al. .............. 340/958
2013/0131888 A1* 5/2013 Nutaro et al. .................. 701/1
2014/0061373 A1   3/2014 Krenz
2014/0067169 A1   3/2014 Hughes et al.
2014/0343765 A1* 11/2014 Suiter ............... G08G 5/0056
                                                        701/18

FOREIGN PATENT DOCUMENTS

EP      2660676 A1   11/2013
EP      2666717 A2   11/2013

* cited by examiner

E-TAXI PREDICTIVE PERFORMANCE SYSTEM

BACKGROUND OF THE INVENTION

The present invention generally relates to vehicle controls, and more particularly to providing predictive performance of an electric based taxi system.

An aircraft equipped with an electric taxi (eTaxi) system provides ground movement using an auxiliary power unit generator (APUG) powering electric drive motor(s) rather than using thrust from the main engines. An eTaxi system may provide aircraft movement around an airport with the potential to provide substantial fuel savings to airline operators.

Conventional taxiing with an aircraft's main engines, may provide excess power at idle, allowing the pilot to achieve any desired taxi speed, regardless of aircraft weight or airport surface condition at the cost of burning fuel. Electric based taxi systems, however, may provide variable performance based on the mechanical design of the eTaxi system, the power available from the APUG, the taxiway slope, the aircraft weight, the tire construction and tire pressure, and other factors. This may present pilots with a totally different operational capability which may seem unfamiliar especially to those new to eTaxi. As conditions change, the eTaxi system may not have the same capability to move the aircraft. Moreover, the pilot may overestimate the aircraft's capability in certain conditions to traverse a distance within a sufficient time creating potential delays in the airport taxiing environment.

As can be seen, there is a need to provide information to pilots that may aid situational awareness with electric based taxiing.

SUMMARY OF THE INVENTION

In one aspect of the present invention, an electric taxi predictive performance system may comprise a vehicle; an electric based taxi system for taxiing the vehicle; and a processor configured to: receive environmental data, determine a predicted electric based taxi performance based on the environmental data, and provide the predicted electric based taxi performance for display.

In another aspect of the present invention, a computer program product stored on a non-transitory computer readable medium may include instructions executable by a processing unit to: receive aircraft related environmental data, determine a predicted electric based taxi performance of an aircraft based on the aircraft related environmental data, and provide the predicted electric based taxi performance.

In yet another aspect of the present invention, a method of providing electric based taxing performance may comprise receiving real-time data related to an aircraft, determining a predicted electric based taxi performance of the aircraft based on the real-time data, and providing the predicted electric based taxi performance for display.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

In general, exemplary embodiments of the present invention address the variable performance nature of an eTaxi system by providing predicted eTaxi performance. As previously described, an eTaxi system may be an electric based taxi system providing ground movement of a vehicle powered by electric drives. The predicted performance of the drives to move the vehicle may be provided on a display to help guide ground operations during taxiing. The information may increase, for example, a pilot's situational awareness using the eTaxi system. For example, embodiments may provide advisory information concerning the time to cross an active runway given current eTaxi and APU performance. By providing predicted information, a pilot may adjust eTaxi operations before reaching a position along the taxi path, thus avoiding inefficient eTaxi operations.

Figure 1:
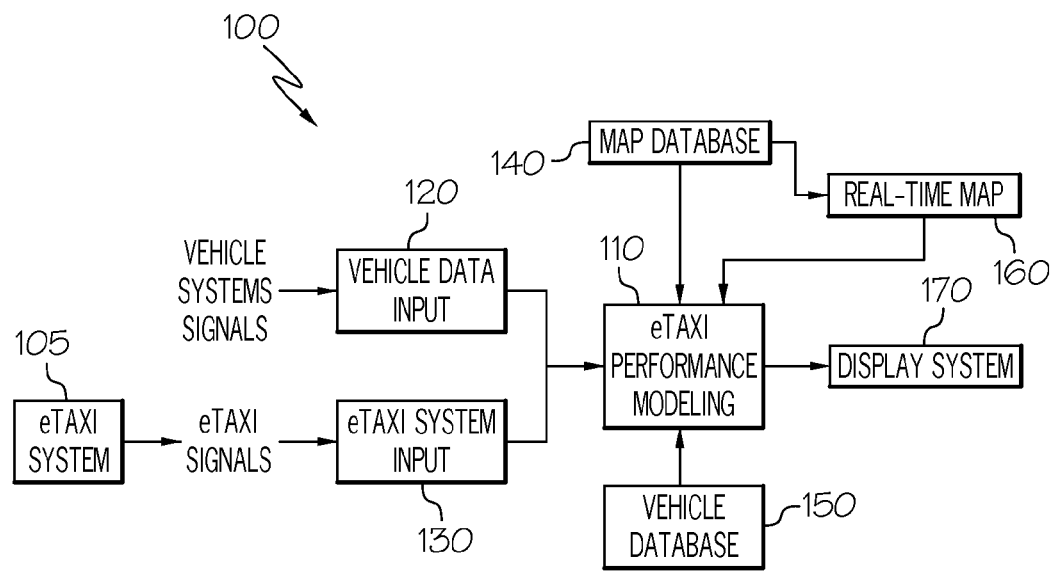
FIG. 1 is a block diagram of an electric taxi predictive performance system according to an exemplary embodiment of the present invention.

Referring now to FIG. 1, an electric taxi predictive performance system 100 (referred to in general as the "system 100") is shown in accordance with an exemplary embodiment of the present invention. The system 100 may include an eTaxi performance modeling module 110 which may gather environmental data to provide models that may predict the performance of eTaxi operations for a vehicle (for example an aircraft) under existing environmental conditions. The environmental data used to predict performance may include stored information about the vehicle, information about the vehicle provided by monitoring the vehicle, and information about the surrounding area. For example, in the context of an aircraft taxiing in an airport, the information may include stored information about the airplane being taxied, information pertaining to the operation of the airplane during taxiing, and information about the airport. The eTaxi performance modeling module 110 may receive data input from the vehicle being taxied and the area upon which the vehicle is taxiing. While the following is described in the context of an aircraft, it will be understood that other vehicle types may benefit from exemplary embodiments of the present invention and the invention is not necessarily limited to just aircraft.

A vehicle data input module 120 and an eTaxi system input module 130 may provide data related to the vehicle. The vehicle data input module 120 may include vehicle systems signals (monitored operating data) pertaining to for example, vehicle weight, tire pressure, current altitude, current ambient temperature, taxi speed, pitch, heading, other aircraft positions (e.g. via Automatic Dependent Surveillance-Broadcast (ADS-B)) and other parameters which can be read from the vehicle's system controller (not shown). The eTaxi system input module 130 may provide eTaxi signals received from an eTaxi system controller (not shown) controlling an eTaxi system 105. The eTaxi system controller data may include currently available performance limits of the aircraft, for example, wheel speed, motor torque, available power, status, and motion constants. A vehicle database module 150 may provide stored vehicle type data specific to the vehicle which may include vehicle weights, APU power capability, tire type, engine type, and other parameters to provide a nominal eTaxi performance model for the particular aircraft.

A map database module 140 (labeled as "Airport Map Database") and a real-time map module 160 may provide data which corresponds to the area or terrain the vehicle is taxiing upon. The map database module 140 may provide stored maps of, for example, a current airport. The maps may include information related to runway and taxiway paths, speed limits, intersections, taxi, takeoff, and landing direction, etc. The real-time map module 160 may provide the real-time location of an airplane on an airport surface as well as information such as distance to a runway or intersection, a turn angle, a maximum allowed speed at the current airport, etc. This information may be used to detect, for example, when the aircraft is approaching a runway, intersection, or other airport feature where the pilot(s) will want to know eTaxi performance capability.

The information compiled by the eTaxi performance modeling module 110 may be output to a display system 170. The data may be presented to the pilot via the display system 170. The data presented may include electronic flight bag information.

Figure 2:
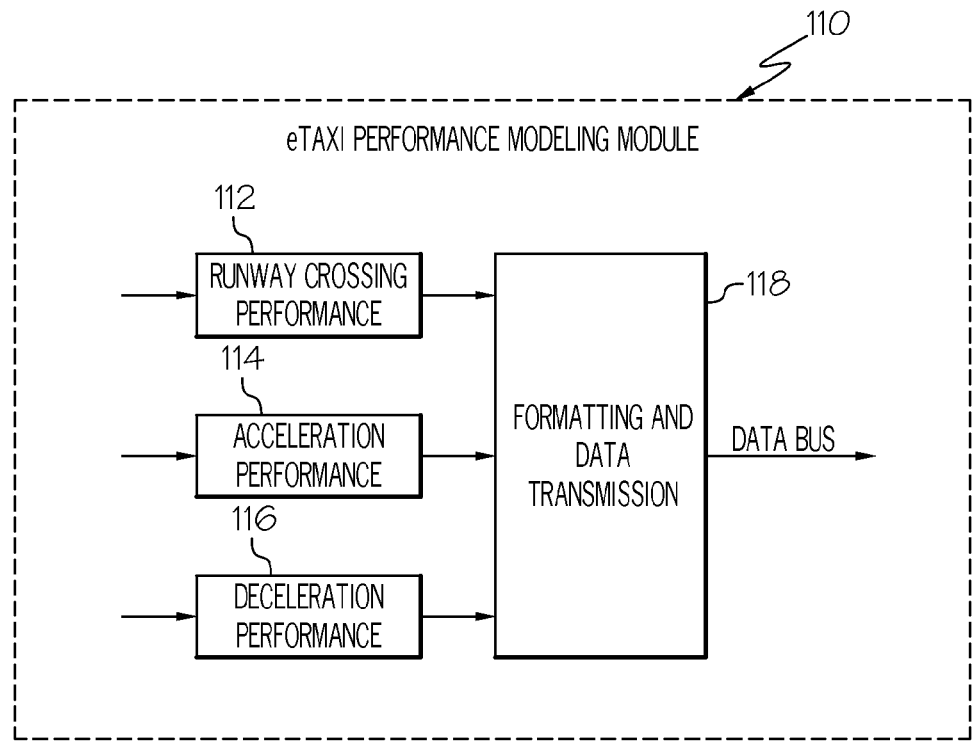
FIG. 2 is a block diagram of an eTaxi performance modeling module of FIG. 1 according to an exemplary embodiment of the present invention.

Referring now to FIG. 2, the eTaxi performance modeling module 110 is shown according to an exemplary embodiment of the present invention. The eTaxi performance modeling module 110 may provide information related to the following which may assist a pilot in navigating an airport safely and efficiently. The data provided from the modules 120, 130, 140, 150, and 160 (FIG. 1) may be processed by the sub-modules 112, 114, and 116 of module 110 as described in the following.

A runway crossing performance module 112 may calculate the predicted time to cross a runway or intersection of a known distance from the aircraft. This information may assist a pilot in understanding if he can cross a runway or taxiway in a timely manner without interfering with oncoming traffic. Unlike conventional taxi systems which may have the pilot overrun the main engines to ensure safe crossing based on visual assessment, the crossing performance module 112 may provide objective criteria freeing the pilot from guessing whether the aircraft may safely cross. An exemplary performance output of the crossing performance module 112 may include time to travel a specified distance. A pilot may thus evaluate whether travel time under eTaxi conditions is sufficient (thus saving fuel costs by avoiding use of the main engines) or instead should rely on use of the main engines to traverse the specified distance.

An acceleration performance module 114 may calculate an aircraft position at some point in the future of the aircraft's path, for example 10 seconds from the aircraft's current location, at the current speed setting set via a crew's flight deck controller (not shown), or at the maximum possible eTaxi speed setting of the aircraft. Information such as maximum possible speed and time to achieve the maximum speed may also be provided. The information provided by the crossing performance module 112 may help the pilot understand under current conditions or at maximum possible eTaxi speed where the aircraft will be at some point in the future. Supplemental tables of time/distance for various speed settings may also be calculated for display (for example, a table of distance reached at 5 second intervals at a current speed setting or at other speed settings).

A deceleration performance module 116 may calculate the time and distance to achieve a certain speed when power to the eTaxi system has been removed and the aircraft is coasting or if regenerative braking is available and is applied to slow the aircraft. This deceleration related information may help the pilot understand, for example, when the aircraft should be slowed for a turn.

A format and transmit module 118 may collect the data from the runway crossing performance module 112, the acceleration performance module 114, and the deceleration performance module 116, format the data and transmit the results for display or use by other systems via appropriate data busses.

Figure 3:
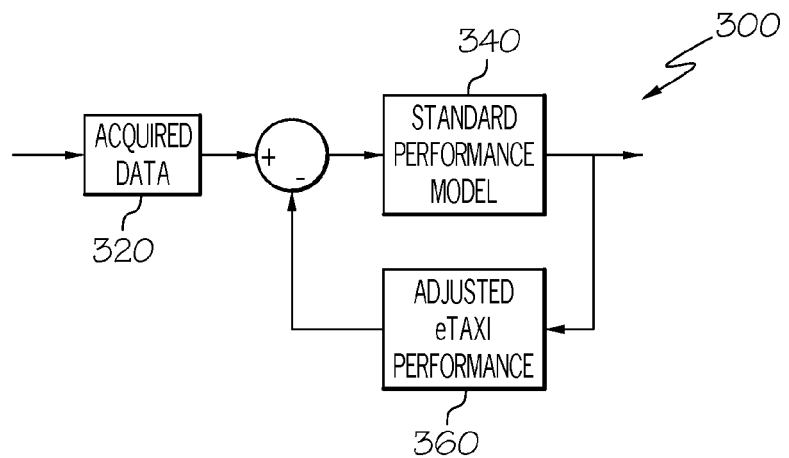
FIG. 3 is a flow diagram of an adaption adjustment process according to an exemplary embodiment of the present invention.

An adaption adjustment process 300 is shown in FIG. 3 according to an exemplary embodiment of the present invention. The process 300 may optimize the eTaxi performance prediction. A typical output of the eTaxi performance modeling module 110 (FIG. 1) may be based on acquired input data 320 (for example, information from the modules 120, 130, 140, 150, and 160 of FIG. 1). In an exemplary embodiment, a nominal standard model 340 may be used to generate predicted performance when historical aircraft and eTaxi data are not available (such as when the aircraft and eTaxi systems are first powered on and before the first aircraft movements under eTaxi are made). Once the aircraft begins taxiing under eTaxi operations, the acquired input data 320 may be used to adjust the nominal standard performance model 340 to provide an adjusted eTaxi performance model 360 to better represent the actual performance being measured. The adjustment is represented in the figure by the mathematical operator between blocks 320 and 340. For example, for a given current flow into the eTaxi motor (not shown) the nominal standard performance model 340 may expect a certain speed. Deviation from that expected speed as actually measured may be used to adjust the output provided by the nominal standard performance model 340 in the displayed adjusted performance model 360 results. Thus the displayed output may be based on a nominal set of characteristics but the eTaxi performance modeling module 110 (FIG. 1) may adapt from information available to provide better predictions. The availability of aircraft data inputs may vary depending upon the aircraft type or on a parameter that is not available due to a failure (for example, for retrofit aircraft whose retrofitted part is not stored in a database). The eTaxi performance modeling module 110 (FIG. 1) may adapt to provide the best prediction possible with the inputs available.

A "confidence" value may be provided along with the displayed results to indicate, from 0.0 to 1.0, the confidence of a prediction. If a prediction result is completely inoperative (for example, due to no aircraft weight information being available) then the confidence value is "0" and no valid information is available for output. If additional information is available such as an aircraft has taxied long enough to collect information to adjust the model (for example, after 10 seconds) and weight data is available, then the confidence value may be set higher (for example, as a score of 0.8). If more information is available (for example, aircraft weight, taxiway slope taken from a database or as an input from other aircraft systems, tire pressure, weather conditions such as rain) the confidence value may be set even higher. At a runway entrance, as explained below, worst case conditions may be initially assumed (for example, assuming the highest runway frictional coefficient) which may provide a confidence value approaching 1.0. The information provided as an output may be adjusted as a function of the confidence value level such that the crew may always receive a conservative prediction. For example, the distance obtainable in, say 10 seconds, may be 200 feet at a relatively high confidence level but may be reduced to 180 feet if the confidence level of the output is low. The output may be adjusted automatically and output. The raw confidence level along with the prediction may also be provided to other systems for their use as desired. For example, the display to the pilot may be a warning of "not available" until the confidence level reaches a predetermined value such as 0.5

Figure 4:
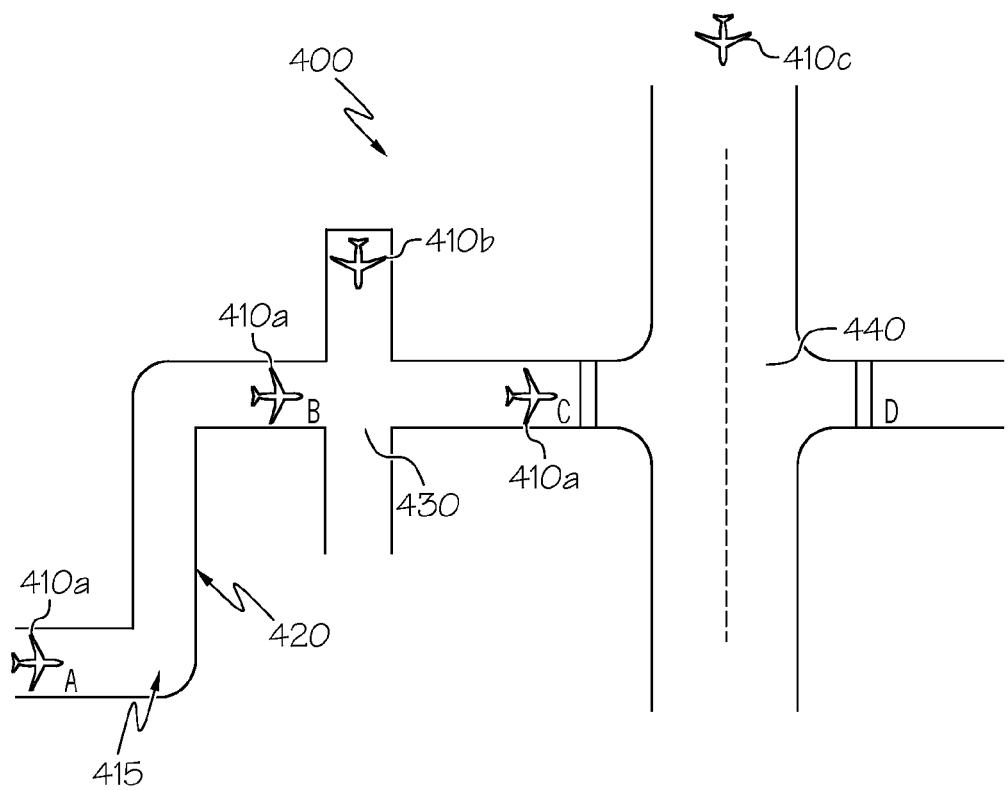
FIG. 4 is a schematic of an area map illustrating an exemplary vehicle and vehicle path using the electric taxi predictive performance system of FIG. 1.
Figure 5:
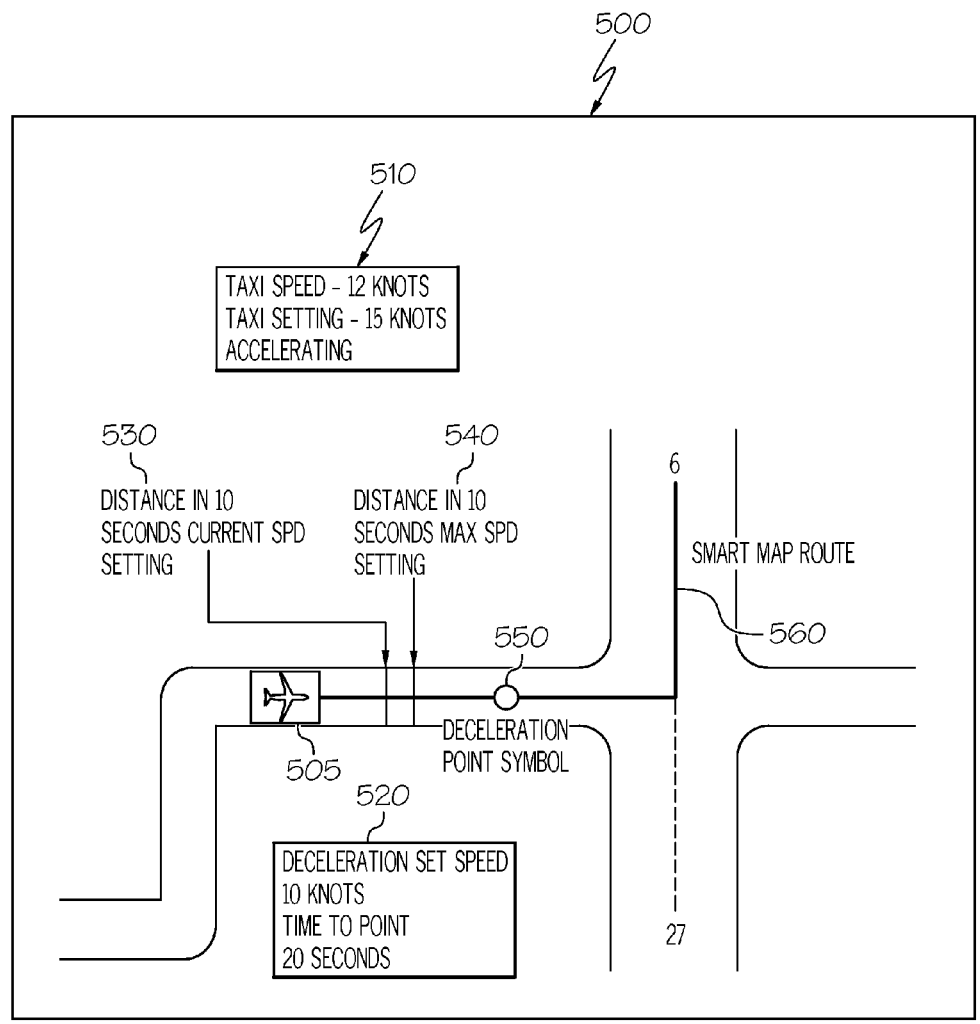
FIG. 5 is a display showing output of the electric taxi predictive performance system of FIG. 1 according to an exemplary embodiment of the present invention.

Referring now to FIGS. 1, 4, and 5 concurrently, operation of the system 100 (FIG. 1) relative to conditions at different points on an exemplary area map 400 (FIG. 4) is shown. The results of the eTaxi performance modeling module 110 may be displayed on a real-time map display 500 (FIG. 5). It will be understood that the real-time map display 500 is one example and that variations or other formats for the real-time map display 500 may be used. The area map 400 shows a vehicle 410a (herein referred to as aircraft 410a for sake of illustration) at different positions (A, B, C, D) along a taxiway 420. The different positions (A, B, C, D) of FIG. 4 represent points at which the eTaxi performance modeling module 110 may provide displayed output depending on the environmental conditions related to the aircraft 410a. In FIG. 5, the location of the aircraft 410a is represented by the symbol 505 as the aircraft 410a approaches position B. The real-time map 500 may display a taxi speed table 510 which may include an actual taxi speed and a taxi speed setting input by the pilot. The real-time map 500 may also include a deceleration table 520 which may include a deceleration set speed and the time to reach a designated point on the real-time map 500. In some embodiments, the points of reference on the real-time map 500 may be manually selected by the pilot or may be pre-designated points included with stored versions of the area map 400.

At position A, the aircraft 410a may be assumed to have just left a gate area (not shown) or to have landed and exited a nearby runway (not shown). The eTaxi performance modeling module 110 may be providing performance predictions using the nominal standard performance model 340 (FIG. 3) based on the vehicle data input module 120, eTaxi system input module 130, the map database module 140, and the vehicle database module 150. Typically, at a gate area, the inputs available to model may be aircraft weight and APUG power availability for eTaxi. The aircraft weight may be retrieved from the aircraft 410a's flight management system (not shown) or electronic flight bag or other systems. The predicted performance provided by the eTaxi performance modeling module 110 may include distance covered within a specified time period at the current speed, maximum possible speed, time to achieve maximum possible speed, time to travel a specified distance as well as similar information for deceleration.

Still referring to position A, the pilot may set the speed desired via a flight deck controller (not shown) to, for example, 20 knots. As the aircraft 410a starts moving the eTaxi performance modeling module 110 may use the nominal values retrieved from the aircraft database module 150 (for example, the runway friction value ($\mu$)), thus the output from the eTaxi performance modeling module 110 may have a low confidence value as not enough environmental data is collected to raise the confidence level. The display system 170 may not display any value until the confidence level is greater than a predetermined value, for example 0.5. It may take a few seconds until enough performance data is accumulated to adjust the predicted performance output. Once predicted performance(s) are calculated, the real-time map 500 may display, for example, a distance to reach in 10 seconds based on acceleration (acceleration being affected by weight, APU power, and actual runway conditions). The distance to reach in 10 seconds may change as the aircraft 410a accelerates. In some embodiments, the information displayed on the real-time map 500 may be refreshed at predetermined intervals (for example 0.25 second intervals). As the aircraft 410a travels along its path, the eTaxi performance modeling module 110 may be collecting more data as the aircraft 410a accelerates to provide real-time performance and updated predictive performance so that predictions are made more accurately and with improving confidence levels. The real-time map 500 may be constantly indicating the distance to intersections (for example, intersection 415). The eTaxi performance modeling module 110 may calculate the distance from the intersection 415 the pilot needs to reduce eTaxi speed in order to make the turn safely and efficiently (for example, without manual breaking). The appropriate distance may be displayed concurrently with the symbol 505 showing the current position of the aircraft 410a along with a predicted time to the point (for example, the intersection 415) so the pilot can then reduce the speed setting to the appropriate value calculated by the eTaxi performance modeling module 110 which may also be displayed. After the turn the pilot can reset the speed setting as desired. If in the pilot's judgment the speed is not reducing fast enough to make the turn the pilot can apply brakes manually to assist in deceleration. In addition a warning may generated if the deceleration and distance to turn do not appear to be proper. The eTaxi performance modeling module 110 may constantly monitor taxi speed and distance to turn and deceleration as a check upon the predictions to present such a warning.

At position B the eTaxi performance modeling module 110 may be adjusting performance predictions (per for example, the process 300 of FIG. 3) based on performance feedback from the aircraft systems. The information provided to the eTaxi performance modeling module 110 may include the distance needed to traverse a taxiway intersection 430 and the distance a nearby approaching aircraft 410b is from the intersection 430. Adjustments may be made on expected speed to the aircraft 410a for a given current or torque level applied to the electric motor powering the e-Taxi systems driving the aircraft 410a's wheels (not shown). These adjustments may tune the standard performance model 340 (FIG. 3) to match actual performance. This may improve the performance predictions. As the pilot approaches point B, an intersection 430, the real-time map 500 may display the distance 530 traveled within a predetermined time under a current speed setting. The distance 530 may be shown relative to the intersection 430. In some embodiments, a recommended taxi speed may be provided to cross the intersection 430. The real-time map 500 may also display the distance 540 traveled within a predetermined time under a maximum available speed setting. The distance 540 may also be shown relative to the intersection 430. The pilot may then make a judgment based upon seeing another aircraft 410b if the aircraft 410a should attempt the crossing.

At position C, the aircraft 410a may be adjacent a runway 440. The pilot may need to evaluate the ability to traverse the runway 440 to reach the position D before an approaching aircraft 410c crosses the path of aircraft 410a. The eTaxi performance modeling module 110 may at position C have sufficient data to adjust the standard performance model 340 (FIG. 3) to provide information related to crossing. Runway crossing information may be provided by the map database module 140. The eTaxi performance modeling module 110 may use this information to estimate the time for the aircraft 410a to cross the runway 440. If environmental or aircraft information is not available with high confidence then nominal values may be used. For example, if the slope of the runway 440 is not known, the eTaxi performance modeling module 110 may assume a nominal 1.5 percent crowning slope and maximum runway friction ($\mu$) when crossing the runway 440 to avoid underestimating the eTaxi performance necessary to cross without interfering with traffic on the runway. As shown, unless the runway condition(s) is known with extremely high confidence, an exemplary embodiment of the present invention may use worst case nominal values to provide predictive performance when crossing the runway 440, which may provide the crew with high confidence that crossing is safe at the cost of, in some cases, over-predicting the time to cross by several seconds.

In some embodiments, the vehicle data input module 120 and the display system 170 may also include information related to other aircraft positions (for example, aircraft 410b and aircraft 410c) and current speed/holding at the airport. The eTaxi performance modeling module 110 may include an aircraft interference model which may identify the closest aircraft on adjacent taxiways and runways and may determine, at the crossing time and speed calculated if there may be interference (a collision). For example, the eTaxi performance modeling module 110 may determine and display a deceleration point 550 at which the pilot should begin decelerating to avoid a collision with aircraft 410c approaching on its own path 560. The deceleration point 550 determined may be advisory depending on the integrity level of the system 100 (FIG. 1). In some embodiments, the time to the deceleration point 550 may be displayed in the deceleration table 520. In some embodiments, a recommended deceleration taxi speed may be provided to avoid overshoot into the runway 440.

Figure 6:
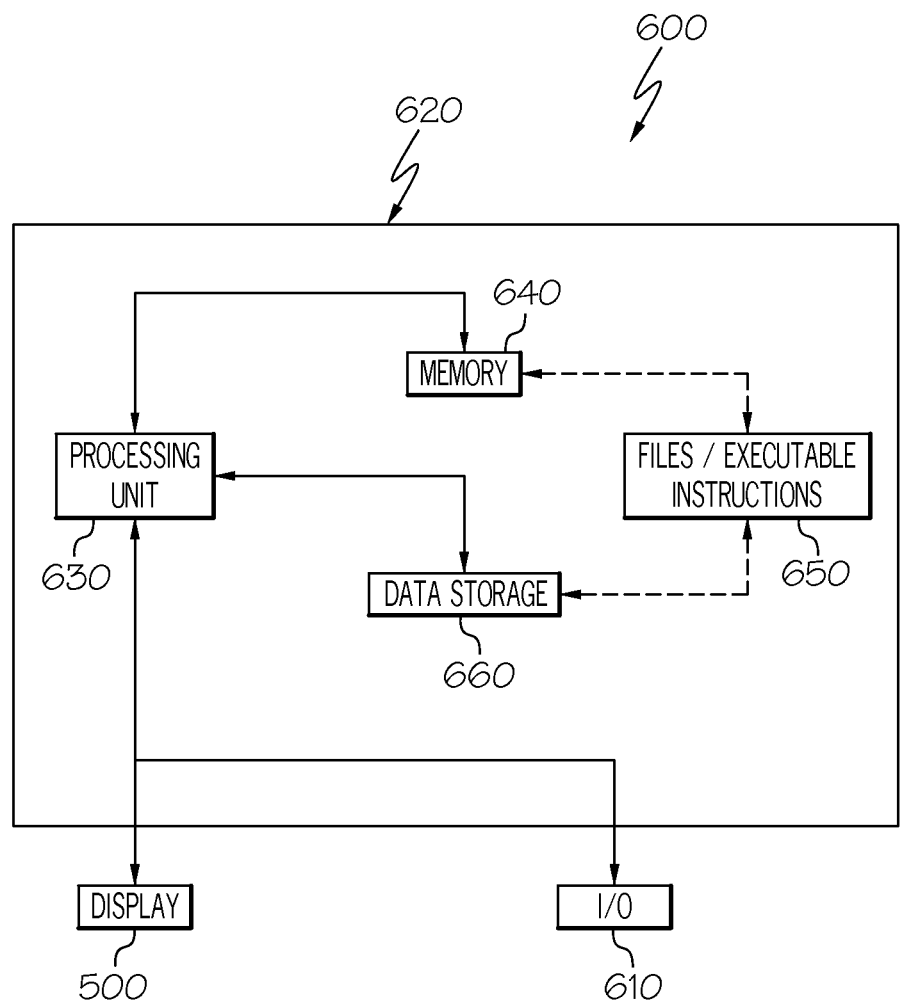
FIG. 6 is a block diagram of a computing system according to an exemplary embodiment of the present invention.

Referring now to FIG. 6, a computing system 600 for storing and processing the information provided by the eTaxi performance modeling module 110 (FIG. 1) is shown according to an exemplary embodiment of the present invention. The computing system 600 may reside on the taxiing vehicle (for example, on aircraft flight management systems or an electronic flight bag) or may be remote providing information to the taxiing vehicle via electronic transmission. The computing system 600 may include a computer or server 620 processing the information provided to the eTaxi performance modeling module 110 (FIG. 1).

The information processed by the computer or server 620 may be transmitted to the real-time map display 500. Information provided to the computer or server 620 may be provided via an I/O module 610. The computer or server 620 may include a processing unit 630, a memory module 640, and data storage 660. An exemplary embodiment of the present invention may be in the form of software files/executable instructions 650 stored in either or both the memory module 640 and the data storage module 660. In some embodiments, the memory module 640 and the data storage module 660 may be in the form of non-transitory computer readable media, which may include for example, disks, optical media, and solid state media.

Figure 7:
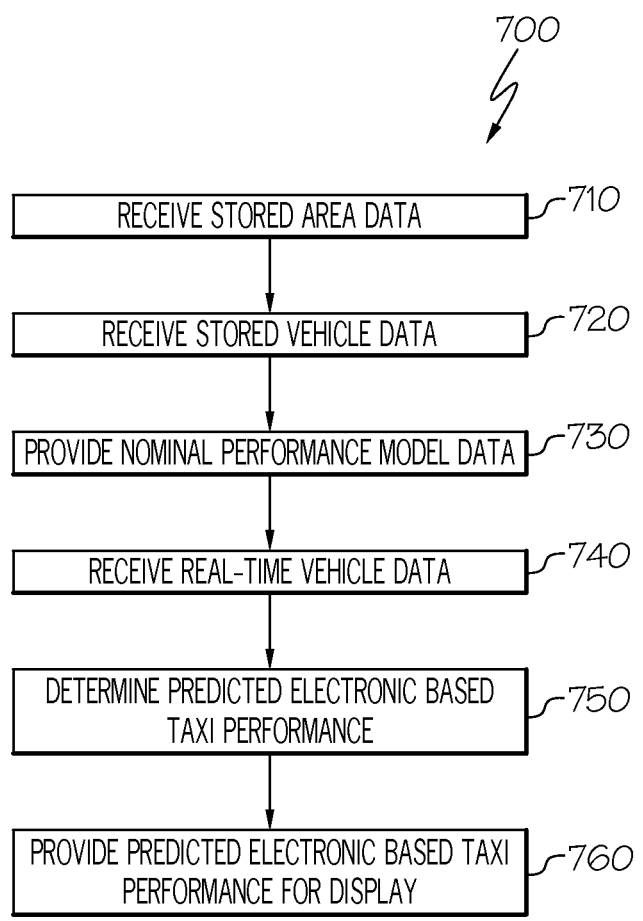
FIG. 7 is a flow chart of a method of providing electric based taxi performance according to an exemplary embodiment of the present invention.

Referring now to FIG. 7, a method 700 of providing electric based taxi performance is shown according to an exemplary embodiment of the present invention. The method 700 may be performed and displayed in relation to the embodiments described with respect to FIGS. 1, 4, and 5. In some embodiments, the steps described in blocks of method 700 may be performed by a processing unit, (for example, the processing unit 630 of FIG. 6). In block 710, the processing unit may receive stored area data pertaining to the area on which the vehicle is taxiing. In block 720, the processing unit may receive stored vehicle data related to the vehicle being taxied. In block 730, the processing unit may use the stored area data and/or the stored vehicle data to provide a nominal performance model data. In block 740, the processing unit may receive real-time vehicle related data which may include information regarding the current position of the vehicle and the current operating levels of the vehicle. In block 750, the processing unit may use the real-time vehicle data to determine a predicted electric based taxi performance for the vehicle. In block 760, the processing unit may provide the predicted electric based taxi performance for display.

It should be understood, of course, that the foregoing relates to exemplary embodiments of the invention and that modifications may be made without departing from the spirit and scope of the invention as set forth in the following claims.

We claim:

1. An electric taxi predictive performance system, comprising:
   an electric based taxi system configured to link to a vehicle;
   a vehicle data input module that gathers operating data of the vehicle;
   an electric taxi input module that gathers performance limits of the vehicle;
   a map database module that stores maps of an area in which the vehicle can taxi;
   a vehicle database module that stores vehicle type data;
   a real-time map module that provides real-time location of the vehicle in an area in which the vehicle is taxiing;
   a performance modeling module that uses the vehicle data input module, the electric taxi input module, the map database module, the vehicle database module and the real-time map module to provide predicted electric based taxi performance; and
   wherein the performance modeling module is configured to:
      determine if environmental data is known,
      receive environmental data if environmental data is known,
      continuously determine over time predicted electric based taxi performance based on the environmental data if the environmental data is determined to be available, or based on worst case data if the environmental data is determined to not be available, and
cause to be displayed predicted electric based taxi performance that is changing over time;
wherein the displayed changing predicted electric based taxi performance is accompanied by a displayed changing confidence value of the changing predicted performance that is calculated using data comprising vehicle weight, weather conditions, and frictional coefficient of the path;
wherein the displayed, changing predicted electric based taxi performance and the displayed changing confidence value enable an operator of the vehicle to manipulate the electric based taxi system and thereby avoid inefficient electric taxi operation of the vehicle.

2. The system of claim 1, wherein the predicted electric based taxi performance includes a predicted taxi speed of the vehicle.

3. The system of claim 2, wherein the predicted taxi speed of the vehicle is a maximum speed available.

4. The system of claim 1, wherein the vehicle is an aircraft.

5. The system of claim 4, wherein the environmental data includes data corresponding to the aircraft.

6. The system of claim 5, wherein the environmental data includes data corresponding to an airport where the aircraft is taxiing.

7. The system of claim 6, wherein the predicted electric based taxi performance includes a time to cross a section of airport runway or taxi intersection.

8. A computer program product stored on a non-transitory computer readable medium including instructions executable by a processing unit to:
receive an aircraft performance model, wherein the aircraft performance model is representative of known performance of the aircraft,
receive aircraft related environmental data,
determine a predicted electric based taxi performance of an aircraft based on the aircraft related environmental data and the performance model for the aircraft, wherein the predicted electric based taxi performance changes over time;
calculate a confidence value for the predicted electric based taxi performance, wherein the confidence value changes over time; and
generate a control signal based on the predicted electric based taxi performance;
display the control signal to a user when the confidence value exceeds a predetermined threshold value;
convert, based on the confidence value, the predicted electric based taxi performance to an adjusted predicted electric based taxi performance;
while the aircraft is taxiing in an airport, continuously warn, based on the adjusted predicted electric based taxi performance, whether operator initiated accident-avoidance movement of the aircraft is insufficient.

9. The computer program product of claim 8, including instructions executable by a processor to provide a recommended taxi speed.

10. The computer program product of claim 8, including instructions executable by a processor to provide a maximum available electric based taxi speed.

11. The computer program product of claim 8, including instructions executable by a processor to provide a recommended electric based taxi deceleration.

12. The computer program product of claim 8, wherein the aircraft related environmental data includes data corresponding to an airport where the aircraft is taxiing.

13. The computer program product of claim 12, wherein the predicted electric based taxi performance includes a time to cross a section of airport runway.

14. The computer program product of claim 8, including instructions executable by a processor to provide a distance reached in a preset time.

15. The computer program product of claim 8, including instructions executable by a processor to provide a distance reached under a maximum available power.

16. The computer program product of claim 8, wherein the predicted electric based taxi performance is displayed on the aircraft.

17. A method of generating electric based taxiing performance, comprises:
using a performance modeling module having a runway crossing module, an acceleration module, and deceleration module,
wherein the runway crossing module enables an aircraft operator to determine if the aircraft can cross a path without interfering with other aircraft,
wherein the acceleration module calculates a position of the aircraft at a future time,
wherein the deceleration module calculates a time and distance for the aircraft to achieve a certain speed at a given power,
wherein the performance modeling module is configured for:
receiving a first instance of real-time data related to an aircraft,
determining an initial predicted electric based taxi performance of the aircraft based on the first instance of the real-time data,
receiving a second instance of real-time data,
comparing the initial predicted electric based taxi performance and the second instance of real-time data,
determining an updated predicted electric based taxi performance of the aircraft based on the initial predicted electric based taxi performance of the aircraft and further based on any deviation from the initial predicted electric based by the second instance of the real-time data,
adjusting the updated predicted electric based taxi performance based on a confidence value,
displaying the adjusted, updated predicted electric based taxi performance, and
enabling the operator to adjust an electric based taxi system of the aircraft.

18. The method of claim 17, adjusting the predicted electric based taxi performance based on currently available performance limits of the aircraft.

19. The method of claim 18, wherein the currently available performance limits include a maximum available taxi speed of the aircraft.

20. The method of claim 17, wherein the predicted electric based taxi performance is based on at least a weight of the aircraft and a power output available from an electric power source of the aircraft.

* * * * *